US008775345B2

(12) United States Patent
Asadi et al.

(10) Patent No.: US 8,775,345 B2
(45) Date of Patent: Jul. 8, 2014

(54) RECOVERING THE STRUCTURE OF SPARSE MARKOV NETWORKS FROM HIGH-DIMENSIONAL DATA

(75) Inventors: Narges Bani Asadi, Stanford, CA (US); Guillermo A. Cecchi, New York, NY (US); Dimitri Kanevsky, Ossining, NY (US); Bhuvana Ramabhadran, Mt. Kisco, NY (US); Irina Rish, Rye Brook, NY (US); Katya Scheinberg, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/617,558

(22) Filed: Sep. 14, 2012

(65) Prior Publication Data
US 2013/0013538 A1    Jan. 10, 2013

Related U.S. Application Data

(63) Continuation of application No. 12/551,297, filed on Aug. 31, 2009, now Pat. No. 8,326,787.

(51) Int. Cl.
| *G06F 17/00* | (2006.01) |
| *G06F 7/60* | (2006.01) |
| *G06F 3/00* | (2006.01) |
| *G06N 99/00* | (2010.01) |

(52) U.S. Cl.
CPC ..................................... *G06N 99/005* (2013.01)
USPC .................................. 706/45; 703/2; 715/700

(58) Field of Classification Search
None
See application file for complete search history.

(56) References Cited

U.S. PATENT DOCUMENTS

| 6,380,934 | B1 | 4/2002 | Freeman et al. |
| 6,496,184 | B1 | 12/2002 | Freeman et al. |
| 6,917,952 | B1 | 7/2005 | Dailey et al. ............ 707/999.005 |
| 8,326,787 | B2 * | 12/2012 | Asadi et al. ..................... 706/45 |
| 2005/0278357 | A1 | 12/2005 | Brown et al. |
| 2007/0083343 | A1 | 4/2007 | Haft et al. |
| 2008/0147573 | A1 | 6/2008 | Hamadi |

* cited by examiner

*Primary Examiner* — Alan Chen
(74) *Attorney, Agent, or Firm* — Jose Gutman; Fleit Gibbons Gutman Bongini & Bianco PL

(57) ABSTRACT

A method, information processing system, and computer readable article of manufacture model data. A first dataset is received that includes a first set of physical world data. At least one data model associated with the first dataset is generated based on the receiving. A second dataset is received that includes a second set of physical world data. The second dataset is compared to the at least one data model. A probability that the second dataset is modeled by the at least one data model is determined. A determination is made that the probability is above a given threshold. A decision associated with the second dataset based on the at least one data model is generated in response to the probability being above the given threshold. The probability and the decision are stored in memory. The probability and the decision are provided to user via a user interface.

20 Claims, 5 Drawing Sheets

RECOVERING THE STRUCTURE OF SPARSE MARKOV NETWORKS FROM HIGH-DIMENSIONAL DATA

CROSS-REFERENCE TO RELATED APPLICATION

This application is a continuation of and claims priority from prior U.S. patent application Ser. No. 12/551,297 filed on Aug. 31, 2009, now U.S. Pat. No. 8,326,787; the entire disclosure being herein incorporated by reference in its entirety.

FIELD OF THE INVENTION

The present invention generally relates to data modeling, and more particularly relates to reconstructing sparse Markov networks.

BACKGROUND OF THE INVENTION

In many applications of statistical learning the objective is not simply to construct an accurate predictive model, but rather to discover meaningful interactions among the variables. This is particularly important in biological applications such as, for example, reverse-engineering of gene regulatory networks, or reconstruction of brain-activation patterns from functional MRI (fMRI) data. Probabilistic graphical models such as Markov networks (or Markov Random Fields) provide a principled way of modeling multivariate data distributions that is both predictive and interpretable.

A conventional approach to learning Markov network structure is to choose the simplest model, i.e. the sparsest network that adequately explains the data. Formally, this leads to a regularized maximum-likelihood problem with the penalty on the number of parameters, or $l_0$ norm, a generally intractable problem that was often solved approximately by greedy search (See D. Heckerman. A tutorial on learning Bayesian networks, Tech.Report MSR-TR-95-06. *Microsoft Research,* 1995, which is hereby incorporated by reference in its entirety). Recently, even better approximation methods were suggested that exploit sparsity-enforcing property of $l_1$-norm regularization and yield convex optimization problems that can be solved efficiently (See N. Meinshausen and P. Buhlmann. High dimensional graphs and variable selection with the Lasso. *Annals of Statistics,* 34(3):1436-1462, 2006; M. Wainwright, P. Ravikumar, and J. Lafferty. High-Dimensional Graphical Model Selection Using l1-Regularized Logistic Regression. In *NIPS* 19, pages 1465-1472. 2007; M. Yuan and Y. Lin. Model Selection and Estimation in the Gaussian Graphical Model. *Biometrika,* 94(1):19-35, 2007; O. Banerjee, L. El Ghaoui, and A. d'Aspremont. Model selection through sparse maximum likelihood estimation for multivariate gaussian or binary data. *Journal of Machine Learning Research,*9:485-516, March 2008; and J. Friedman, T. Hastie, and R. Tibshirani. Sparse inverse covariance estimation with the graphical lasso. *Biostatistics,* 2007, which are hereby incorporated by reference in their entireties). However, those approaches are known to be sensitive to the choice of the regularization parameter, i.e. the weight on $l_1$-penalty, and selection of the regularization parameter still remains a difficult task.

SUMMARY OF THE INVENTION

In one embodiment, a computed implemented method for modeling data is disclosed. The computer implemented method is executed on at least one information processing system. The computer implemented method comprises receiving a first dataset that comprises a first set of physical world data. At least one data model associated with the first dataset is generated based on the receiving. A second dataset is received that comprises a second set of physical world data. The second dataset is compared to the at least one data model. A probability that the second dataset is modeled by the at least one data model is determined based on the comparing. A determination is made that the probability is above a given threshold. A decision associated with the second dataset based on the at least one data model is generated in response to the probability being above the given threshold. The probability and the decision are stored in memory. The probability and the decision are provided to user via a user interface that is communicatively coupled to the at least one information processing system.

In another embodiment, an information processing system for modeling data is disclosed. The information processing system comprises a memory and a processor that is communicatively coupled to the memory. A learning system is communicatively coupled to the memory and the processor. The learning system receives a first dataset that comprises a first set of physical world data. At least one data model associated with the first dataset is generated based on the receiving. A second dataset is received that comprises a second set of physical world data. The second dataset is compared to the at least one data model. A probability that the second dataset is modeled by the at least one data model is determined. A determination is made that the probability is above a given threshold. A decision associated with the second dataset based on the at least one data model is generated in response to the probability being above the given threshold. The probability and the decision are stored in memory. The probability and the decision are provided to user via a user interface that is communicatively coupled to the at least one information processing system.

In yet another embodiment, a computer readable article of manufacture tangibly embodying computer readable instructions is disclosed. When the compute instructions are executing a computer carries out the steps of a method comprising receiving a first dataset that comprises a first set of physical world data. At least one data model associated with the first dataset is generated based on the receiving. A second dataset is received that comprises a second set of physical world data. The second dataset is compared to the at least one data model. A probability that the second dataset is modeled by the at least one data model is determined. A determination is made that the probability is above a given threshold. A decision associated with the second dataset based on the at least one data model is generated in response to the probability being above the given threshold. The probability and the decision are stored in memory. The probability and the decision are provided to user via a user interface.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

General Overview

As discussed above, conventional systems utilizing $l_1$-regularized maximum-likelihood optimization methods for learning sparse Markov networks result in convex problems that can be solved optimally and efficiently. However, the accuracy of such methods can be very sensitive to the choice of regularization parameter, and optimal selection of this parameter remains an open problem. Therefore, various embodiments of the present invention utilize a maximum a-posteriori probability (MAP) approach that investigates different priors on the regularization parameter $\lambda$ and yields more efficient and accurate results on both synthetic data and real-life application such as brain imaging data (fMRI data).

The maximum a-posteriori probability approach to selecting the regularization parameter for sparse Markov network reconstruction allows for better accuracy than previously proposed approaches and a more balanced trade-off between false-positive and false-negative errors. Therefore, the various embodiments result in learning a predictive probabilistic model of the data that also provides a more accurate structure of the underlying dependencies between the variables (e.g., gene interactions, or voxel interactions).

Figure 1:
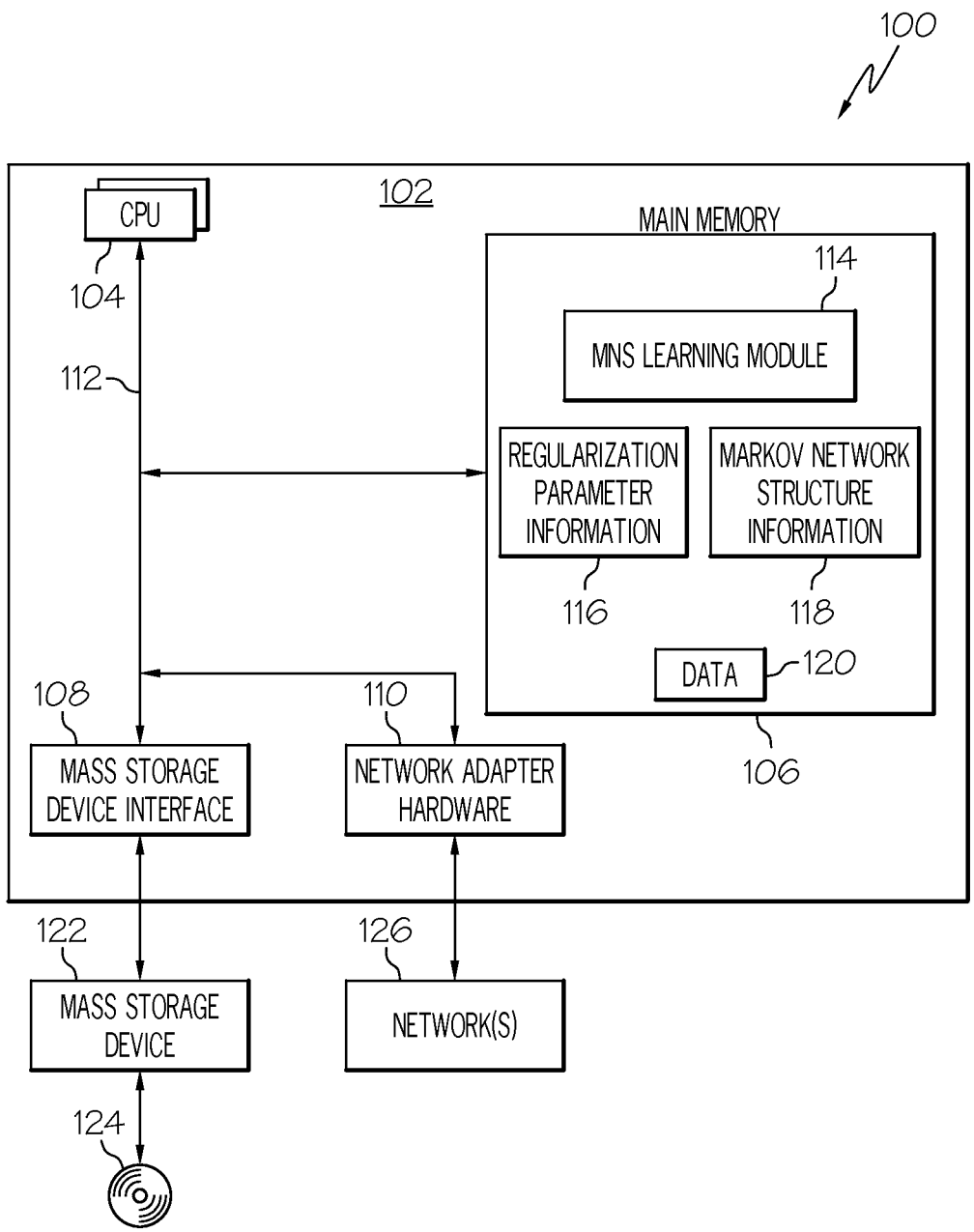
FIG. 1 is a block diagram illustrating an information processing system for recovering the structure of sparse Markov networks, according to one embodiment of the present invention.

FIG. 1 is a block diagram illustrating one example of an information processing system 100 for recovering the structure of sparse Markov networks. In one embodiment, the information processing system 100 is based upon a suitably configured processing system adapted to implement one or more embodiments of the present invention. Similarly, any suitably configured processing system can be used as the system 100 by various embodiments of the present invention. It should be noted that although FIG. 1 shows the system 100 as a single system, this system 100 can be distributed across multiple systems as well. Additionally, according to certain embodiments, the multiple systems can be remotely located from each other and communicatively coupled over one or more networks, The system 100 includes a computer 102. The computer 102 has a processor(s) 104 that is connected to a main memory 106, mass storage interface 108, and network adapter hardware 110. A system bus 112 interconnects these system components. The main memory 106, in one embodiment, comprises a Markov Network Structure ("MNS") learning module/learning system 114, regularization parameter information 116, Markov network structure information 118, and data 120. The MNS learning module 114 analyzes the data 120 and based on this analysis selects a regularization parameter for performing sparse Markov network reconstruction. The regularization parameter generated and selected based on this analysis is stored as the regularization parameter information 116. The sparse Markov network generated by the reconstruction process is stored as the Markov network structure information 118. The MNS learning module 114 learns a predictive probabilistic model of the data 120 that provides a more accurate structure of the underlying dependencies between the variables/data 120 (e.g., gene interactions, or voxel interactions). The data 120, in one embodiment, is high-dimensional data such as, but not limited to, gene data, fMRI data, and the like. It should be noted that the MNS learning module 114 is not required to reside within the main memory 106 and can be implemented as hardware as well. The MNS learning module 114, regularization parameter information 116, and the Markov network structure information 118 is discussed in greater detail below.

The mass storage interface 108 is used to connect mass storage devices, such as data storage device 122, to the system 100. One specific type of data storage device is an optical drive such as a CD/DVD drive, which may be used to store data to and read data from a computer readable medium or storage product such as (but not limited to) a CD/DVD 124. Another type of data storage device is a data storage device configured to support, for example, NTFS type file system operations.

In one embodiment, the system 100 utilizes conventional virtual addressing mechanisms to allow programs to behave as if they have access to a large, single storage entity, referred to herein as a computer system memory, instead of access to multiple, smaller storage entities such as the main memory 106 and mass storage device 122. Note that the term "computer system memory" is used herein to generically refer to the entire virtual memory of the system 100.

Although only one CPU 104 is illustrated for computer 102, computer systems with multiple CPUs can be used equally effectively. Various embodiments of the present invention further incorporate interfaces that each includes separate, fully programmed microprocessors that are used to off-load processing from the CPU 104. An operating system (not shown) included in the main memory is a suitable multitasking operating system such as the Linux, UNIX, Windows XP, and Windows Server operating system. Various embodiments of the present invention are able to use any other suitable operating system. Some embodiments of the present invention utilize architectures, such as an object oriented framework mechanism, that allows instructions of the components of operating system (not shown) to be executed on any processor located within the system 100. The network adapter hardware 110 is used to provide an interface to one or more networks 126. Various embodiments of the present invention are able to be adapted to work with any data communications connections including present day analog and/or digital techniques or via a future networking mechanism.

Problem Formulation

The following is a discussion on formulating an optimization problem. For example, various embodiments of the present invention optimize a joint probability distribution $\max_{C \succ 0, \lambda} \ln p(X,C,\lambda)$, over a given data set X, an associated matrix C, and an associated regularization parameter $\lambda$, as discussed below. Identifying unknown parameters (such as C and $\lambda$) that maximize the probability of the observed data is generally referred to as Maximum-a posteriory probability (MAP) parameter estimation which is discussed below.

Figure 2:
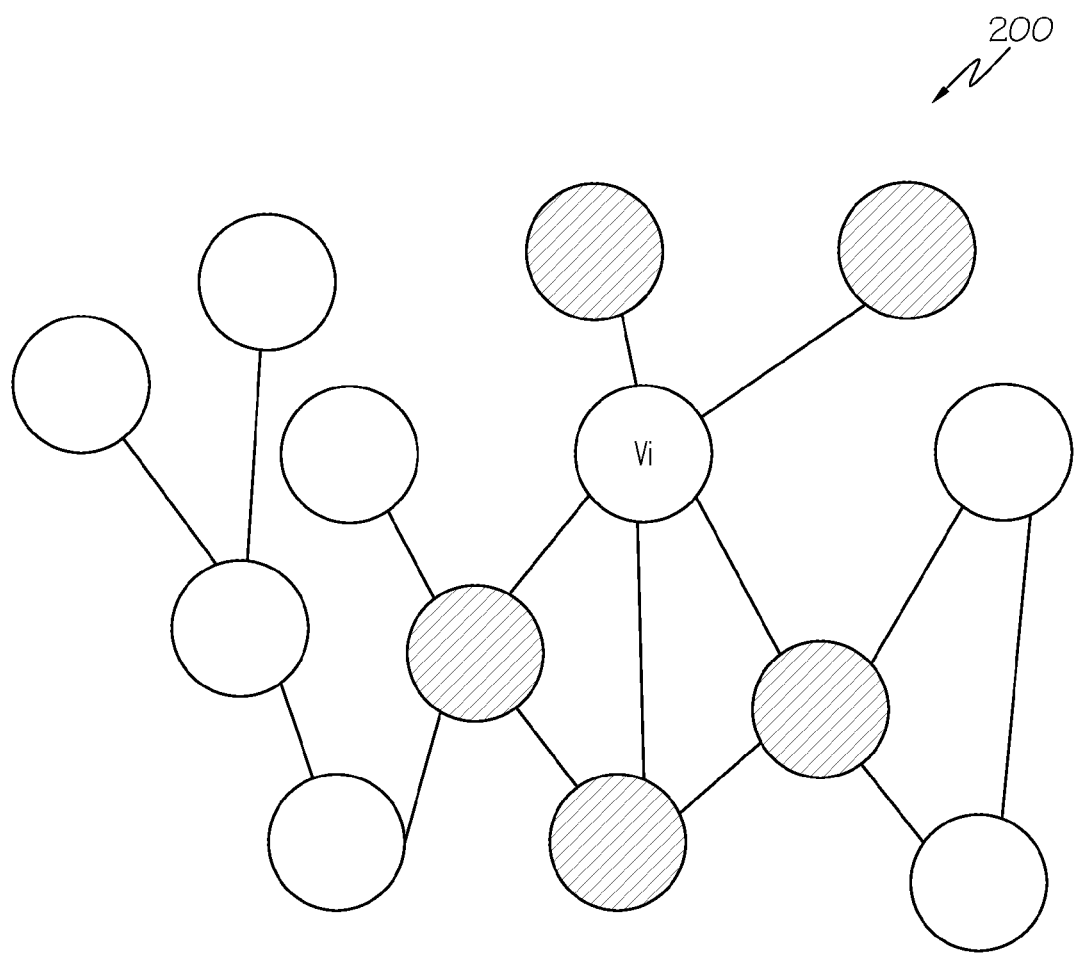
FIG. 2 illustrates an undirected graphical model.

With respect to formulating the optimization problem, let $X = \{X_1, \ldots, X_p\}$ be a set of p random variables, and let $G=(V, E)$ be an undirected graphical model (Markov network) 200, as shown in FIG. 2, representing conditional independence structure of the joint distribution P(X). The set of vertices $V=\{1, \ldots, p\}$ is in the one-to-one correspondence with the set X. The set of edges E contains the edge $(i, j)$ if and only if $X_i$ is conditionally dependent on $X_j$ given all remaining variables; lack of edge between $X_i$ and $X_j$ means that the two variables are conditionally independent given all remaining variables. Let $x=(x_1, \ldots, x_p)$ denote a random assignment to X. In one embodiment, a multivariate Gaussian probability density $$p(x) = (2\pi)^{-p/2} \det(C)^{\frac{1}{2}} e^{-\frac{1}{2} x^T C x}$$

is assumed, where $C = \Sigma^{-1}$ is the inverse covariance matrix, and the variables are normalized to have zero mean. Let $x_1, \ldots, x_n$ be a set of n independent and identically distributed (i.i.d.) samples from this distribution, and let $$S = \frac{1}{n} \sum_{i=1}^{n} x_i^T x_i$$

denote the empirical covariance matrix.

Missing edges in the above graphical model correspond to zero entries in the inverse covariance matrix C, and thus the problem of structure learning for the above probabilistic graphical model is equivalent to the problem of learning the zero-pattern of the inverse-covariance matrix. It should be noted that the inverse of the empirical covariance matrix, even if it exists, does not typically contain exact zeros. Therefore, an explicit sparsity constraint can be added to the estimation process. A common approach is to use $l_1$-regularization that is known to promote sparse solutions. From the Bayesian point of view, this is equivalent to assuming that the parameters of the inverse covariance matrix $C = \Sigma^{-1}$ are independent random variables $C_{ij}$ following the Laplace distributions $$p(C_{ij}) = \frac{\lambda_{ij}}{2} e^{-\lambda_{ij} |C_{ij} - \alpha_{ij}|}$$

with zero location parameters (means) $\alpha_{ij}$ and equal scale parameters $\lambda_{ij} = \lambda$. Then $$p(C) = \prod_{i=1}^{p} \prod_{j=1}^{p} p(C_{ij}) = (\lambda/2)^{p^2} e^{-\lambda \|C\|_1},$$

where $$\|C\|_1 = \sum_{ij} |C_{ij}|$$

is the (vector) $l_1$-norm of C.

A common approach to recovering a sparse inverse covariance matrix is to assume a fixed parameter $\lambda$ and find $\arg\max_{C \succ 0} p(C|X)$, where X is the n×p data matrix, or equivalently, since $p(C|X) = P(X,C)/p(X)$ and $p(X)$ does not include C, to find $\arg\max_{C \succ 0} P(X,C)$, over positive definite matrices C. This yields the following optimization problem (as considered in O. Banerjee et al., J. Friedman et al., and M. Yuan et al.)

$$\max_{C \succ 0} \ln \det(C) - tr(SC) - \lambda \|C\|_1 \quad \text{EQ (1)}$$

where $\det(A)$ and $tr(A)$ denote the determinant and the trace (the sum of the diagonal elements) of a matrix A, respectively.

The regularization parameter $\lambda$ controls the number of non-zero elements (the sparsity) of solutions. The advantage of the above approach is that the problem in EQ. 1 is convex, its optimal solution is unique (See O. Banerjee et al.) and can be found efficiently using recently proposed methods such as COVSEL (See O. Banerjee et al.) or glasso (See J. Friedman et al.). However, there is a known issue with the above approach. As an empirical observation is made the accuracy of the Markov network reconstruction can be very sensitive to the choice of the regularization parameter $\lambda$, and a system/method for optimal selection of $\lambda$ generally does not exist. The two most commonly used approaches are (1) cross-validation and (2) theoretical derivations. However, $\lambda$ selected by cross-validation, i.e. the estimate of the prediction-oracle solution that maximizes the test data likelihood (i e minimizes the predictive risk) is typically too small and yields high false-positive rate. Moreover, (See N. Meinshausen et al.) proved that cross-validated $\lambda$ does not lead to consistent model selection for the Lasso problem, since it tends to include too many noisy connections between the variables. This is not necessarily surprising, given that cross-validation selects $\lambda$ that is best for prediction that might be quite different from the model-selection goal, since it is well-known that multiple probabilistic models having quite different structures may yield very similar distributions.

Existing theoretical derivations for $\lambda$ have their own drawbacks: although N. Meinshausen et al. show that consistent estimate of the structure is possible, they admit that "such asymptotic considerations give little advice on how to choose a specific penalty parameter for a given problem". As a proxy for "best" $\lambda$, N. Meinshausen et al. in their neighborhood-selection approach provide $\lambda$ that allows a consistent recovery of sparse structure of the covariance rather than the inverse covariance matrix, i.e. the recovery of marginal independencies between i-th and j-th variables, rather than conditional independencies given the rest of the variables. Similar approach is used in O. Banerjee et al. to derive $\lambda$ for the optimization problem in EQ. 1. In practice, however, this may result in very high values of $\lambda$ that effectively ignore almost all dependencies (i.e., have high false-negative rate); this was acknowledged by the authors of O. Banerjee et al. in their empirical section, and also confirmed by the inventor's experiments. Thus, proper choice of regularization parameter for the purpose of model selection remains an open problem.

Maximum A-Posteriory Probability Selection of the Regularization Parameter

The system 100 is advantageous over the conventional methods discussed above because the MNS learning module 114 utilizes a maximum a-posteriori probability (MAP) approach. As discussed, the MAP method investigates different priors on the regularization parameter $\lambda$ and yields more efficient and accurate results on both synthetic data and real-life application data. In particular, the MNS learning module 114 uses a Bayesian approach, treating $\lambda$ as a random variable with a prior density $p(\lambda)$, rather than as a fixed parameter. The MNS learning module 114 determines a joint maximum-aposteriory probability (MAP) estimate of $\lambda$ and C by solving $\max_{C \succ 0, \lambda} \ln p(C, \lambda | X)$, or, equivalently, $\max_{C \succ 0, \lambda} \ln p(X, C, \lambda)$, where $$p(X, C, \lambda) = p(X | C) p(C | \lambda) p(\lambda) =$$
$$= \prod_i^n \left[ (2\pi)^{-p/2} \det(C)^{\frac{1}{2}} e^{-\frac{1}{2} x_i^T C x_i} \right] (\lambda/2)^{p^2} e^{-\lambda \|C\|_1} p(\lambda).$$

This results into the following problem instead of EQ. 1:

$$\max_{\lambda, C \succ 0} \frac{n}{2} [\ln\det(C) - tr(SC)] + p^2 \ln\frac{\lambda}{2} - \lambda \|C\|_1 + \ln p(\lambda). \quad \text{EQ (2)}$$

The MNS learning module 114 considers two types of priors (prior probability distributions): a uniform (flat) and an exponential prior $p(\lambda)$. The uniform (flat) prior places equal weight on all values of $\lambda \in [0, \Lambda]$ (assuming sufficiently high $\Lambda$), and thus effectively ignores $p(\lambda)$; this prior is used in Regularized Likelihood embodiment discussed below. The exponential prior assumes that $p(\lambda) = be^{-b\lambda}$, yielding:

$$\max_{\lambda, C \succ 0} \frac{n}{2} [\ln\det(C) - tr(SC)] + p^2 \ln\frac{\lambda}{2} - \lambda \|C\|_1 - b\lambda. \quad \text{EQ. (3)}$$

In one embodiment, the MNS learning module 114 estimates b as $\|S_r^{-1}\|_1/(p^2-1)$, where $S=S+\epsilon l$ is the empirical covariance matrix, slightly regularized with small $\epsilon=10^{-3}$ on the diagonal to obtain an invertible matrix when S is not invertible. The intuition behind such estimate is that $b=1/E(\lambda)$, and the MNS learning module 114 approximates $E(\lambda)$ by the solution to the above optimization problem with C fixed to its empirical estimate $S_r^{-1}$.

With respect to solving the optimization problems discussed above, the MNS learning module 114 considers the optimization problem in EQ. 2 when using an exponential prior. The objective function is concave in C for any fixed $\lambda$, but is not concave in C and $\lambda$ jointly. Hence, the MNS learning module 114 is looking for a local optimum value. The MNS learning module 114 uses an alternating maximization method, which, for each given fixed value of $\lambda$, solves the following problem:

$$\phi(\lambda) = \max_C \frac{n}{2} \ln\det(C) - \frac{n}{2} tr(SC) - \lambda \|C\|_1 \quad \text{EQ. (4)}$$

This problem has a unique maximizer $C(\lambda)$ for any value of $\lambda$ (See O. Banerjee et al.). The MNS learning module 114 now considers the following optimization problem $$\max_\lambda \psi(\lambda) = \max_\lambda \phi(\lambda) + p^2 \ln\lambda - b\lambda. \quad \text{EQ. (5)}$$

Clearly, the optimal solution to this problem is also optimal for problem EQ. (2). The MNS learning module 114 applies the following simple optimization scheme for optimization problem EQ. (5):

0. Initialize $\lambda^1$;
1. find $C(\lambda^k)$, $\phi, \phi^k)$ and $\psi(\lambda^k)$;
2. If $|p^2/\lambda - PC(\lambda^k)P_1 - b| < \epsilon$ go to step 5.
3. $\lambda^{k+1} = p^2/(\|C(\lambda^k)\|_1 + b)$;
4. find $C(\lambda^{k+1})$ and $\psi(\lambda^{k+1})$;
   If $\psi(\lambda^{k+1}) > \psi(\lambda^k)$ go to step 3.
   else $\lambda^{k+1} = (\lambda^k + \lambda^{k+1})/2$. go to step 4.
5. end This scheme applied by the MNS learning module 114 uses line search along the direction of the derivatives and converges to the local maximum (if one exists) as long as some sufficient increase condition (such as Armijo rule (See J. Nocedal and S. J. Wright. Numerical Optimization, Second Edition. Springer, 2006, which is hereby incorporated by reference in its entirety) is applied in Step 4. Step 1 can be performed by any convex optimization method designed to solve problem EQ. (4). In one embodiment, glasso software (See J. Friedman) can also be used.

As can be seen, the MNS learning module 114 initializes the regularization parameter $\lambda$ to a random variable. The MNS learning module 114 then computes the empirical covariance matrix C over n variables and uses C to estimate the parameter(s) of distribution $p(\lambda)$. The MNS learning module 114 then performs the following alternating minimization procedure until convergence is obtained: the MNS learning module 114 solves the following optimization problem for a fixed $\lambda$:

$$\max_{C \succ 0} \frac{n}{2} [\ln\det(C) - tr(SC)] + p^2 \ln\frac{\lambda}{2} - \lambda\|C\|_1 + \ln p(\lambda) \quad \text{(EQ 6)}$$

and as a result obtains a new matrix C that describes a Markov network structure; the MNS learning module 114 then fixes the new matrix C and solves the optimization problem $$\max_\lambda \frac{n}{2} [\ln\det(C) - tr(SC)] + p^2 \ln\frac{\lambda}{2} - \lambda\|C\|_1 + \ln p(\lambda) \quad \text{(EQ 7)}$$

to obtain a new value of $\lambda$. The MNS learning module 114 then updates the old value of $\lambda$ to the new value of $\lambda$. The MNS learning module 114 then outputs $\lambda$ and the Markov network structure encoded by matrix C.

With respect to a fixed $\lambda$, once a matrix C is found by solving the above problem, the system assumes that its value is fixed and searches for a new value of $\lambda$ via solving the optimization problem in EQ. 7. When a new $\lambda$ is found the system assumes that λ is fixed to its found value and begins to search for a new C by solving EQ. 4, and so on, iterating until convergence.

Figure 3:
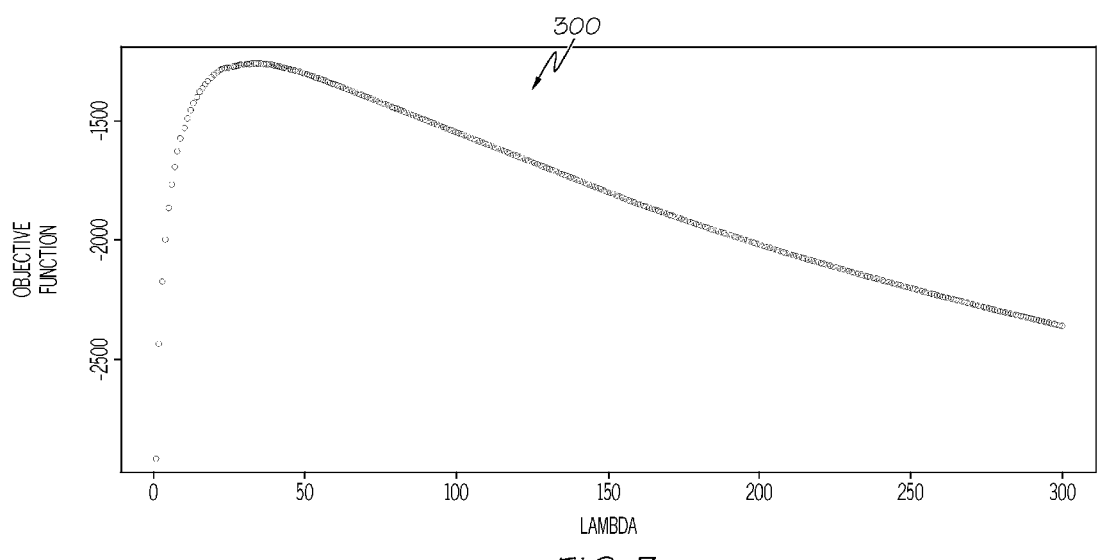
FIG. 3 is a graph of an objective function $\psi(\lambda)$.

FIG. 3 shows a typical shape 300 of objective function $\psi(\lambda)$. An analysis of behavior of the elements that compose $\psi(\lambda)$ can show that for any positive b this function goes to $-\infty$ as λ goes to $\infty$. Hence a maximum of $\psi(\lambda)$ exists for any positive b. The value of λ for which this maximum is achieved increases with b.

The MNS learning module 114 can also perform a regularized likelihood method that utilizes a flat prior. In this embodiment, when b=0, the problem EQ. (2) is equivalent to assuming the flat prior on λ. If n<<p then the term $p^2 \ln \lambda$, may dominate the total sum and $\psi(\lambda)$ may be unbounded from above. Experiments have shown that typically for n>3p the maximum of $\psi(\lambda)$ is finite.

To be able to handle the cases when n<3p, but only a flat prior is assumed, the

MNS learning module 114 utilizes the following modified optimization procedure. Let $$\phi(\lambda) = \max_C \frac{n}{2}\mathrm{lndet}(C) - \frac{n}{2}tr(SC) - \lambda\|C\|_{1,0}$$

where $\|C\|_{1,0}$ is a sum of the absolute values of all off-diagonal elements of C and let C(λ) be the solution to the above convex optimization problem. As λ grows the maximum eigen value of C(λ) no longer converges to zero. In fact one can show that the diagonal elements of C(λ) will converge to the inverse of diagonal of the empirical covariance matrix S. Now the following regularized version of the maximum log-likelihood problem is considered by the MNS learning module 114, as follows:

$$\max_\lambda \psi(\lambda) = \max_\lambda \phi(\lambda) + p^2 \ln\lambda - \lambda \sum_i |C_{ii}|. \quad \text{EQ. (8)}$$

As in the case of positive b it can be shown here that a finite maximum always exists. The advantage of this formulation, referred to as Regularized Likelihood, is that it does not depend on the choice of b and the regularization term arises naturally from the optimization algorithm. A procedure, very similar to the algorithm described in J. Friedman et al. can be applied to this regularized approach. The computational results discussed below show that this approach produces good empirical results.

In order to test the accuracy of the Markov structure reconstruction operation performed by the MNS learning module 114 for synthetic data, two "ground-truth" random inverse-covariance matrices were generated. The first "ground-truth" random inverse-covariance matrix was a very sparse matrix with only 4% (off-diagonal) non-zero elements. The second "ground-truth" random inverse-covariance matrix was a relatively dense matrix with 52% (off-diagonal) non-zero elements. A sampling of n=30, 50, 500, 1000 instances from the corresponding multivariate Gaussian distribution over p=100 variables was performed. The embodiments for Bayesian learning of λ (1) Regularized Likelihood, and (2) Exponential Prior discussed above, were used. The structure-learning performance as well as the prediction performance of the Bayesian λ with the two other alternatives: (1) λ selected by cross-validation using the prediction error, and (2) theoretically derived λ from O. Banerjee et al., were compared.

The structure-learning performance was evaluated by counting the number of True and False edges that were discovered. In the following tables where FN denotes the false-negative error (False Negatives/Positives) and FP denotes the false-positive error (False Positive/Negatives). The term "Positives" is the number of non-zero off-diagonal elements of the original inverse covariance matrix and the term "Negatives" is the number of zero elements of the original inverse covariance matrix. SE (Structure Error) is the overall structure reconstruction error computed as (FN*Positives+ FP*Negatives)/(Positives+Negatives). PE (Prediction error) is the average (overall variables and overall test cases) squared error of prediction on a held-out test data of size 100. $\lambda_r$ denotes the Bayesian λ that is learned by the regularized likelihood, $\lambda_p$ denotes the Bayesian λ that is learned by the joint likelihood with the exponential prior on λ, $\lambda_b$ denotes the λ suggested by Banerjee et. al, and $\lambda_c$ denotes the λ that is learned by 5-fold cross validation.

TABLE 1

Results for p = 100 variables

| | Original Density = 4% 356 Positives and 9544 Negatives | | | | Original Density = 52% 5102 Positives and 4798 Negatives | | | |
|---|---|---|---|---|---|---|---|---|
| | FN | FP | SE | PE | FN | FP | SE | PE |
| | | | | n = 30 | | | | |
| | $\lambda_r = 190, \lambda_p = 34, \lambda_b = 621, \lambda_c = 2$ | | | | $\lambda_r = 500, \lambda_p = 32, \lambda_b = 1120, \lambda_c = 0.4$ | | | |
| $\lambda_r$ | 0.94 | 0.006 | 0.04 | 4.5 | 0.992 | 0.01 | 0.52 | 10.2 |
| $\lambda_p$ | 0.7 | 0.05 | 0.07 | 1.88 | 0.87 | 0.12 | 0.51 | 1.4 |
| $\lambda_b$ | 0.995 | 0 | 0.04 | 6.8 | 0.9997 | 0.0004 | 0.52 | 14.6 |
| $\lambda_c$ | 0.17 | 0.3 | 0.3 | 1.3 | 0.5 | 0.4 | 0.45 | 0.54 |
| | | | | n = 50 | | | | |
| | $\lambda_r = 210, \lambda_p = 51, \lambda_b = 664, \lambda_c = 1$ | | | | $\lambda_r = 500, \lambda_p = 47, \lambda_b = 2209, \lambda_c = 0.4$ | | | |
| $\lambda_r$ | 0.87 | 0.01 | 0.04 | 1.4 | 0.98 | 0.03 | 0.52 | 6.1 |
| $\lambda_p$ | 0.66 | 0.05 | 0.07 | 1.8 | 0.87 | 0.12 | 0.51 | 1.36 |
| $\lambda_b$ | 0.995 | 0 | 0.04 | 6.8 | 0.999 | 0.002 | 0.52 | 13.5 |
| $\lambda_c$ | 0.03 | 0.53 | 0.51 | 1.16 | 0.4 | 0.5 | 0.45 | 0.37 |

TABLE 1-continued

Results for p = 100 variables

| | Original Density = 4% 356 Positives and 9544 Negatives | | | | Original Density = 52% 5102 Positives and 4798 Negatives | | | |
|---|---|---|---|---|---|---|---|---|
| | FN | FP | SE | PE | FN | FP | SE | PE |
| | | | | n = 500 | | | | |
| | $\lambda_r = 55, \lambda_p = 63, \lambda_b = 2517, \lambda_c = 0.1$ | | | | $\lambda_r = 23, \lambda_p = 22, \lambda_b = 5438, \lambda_c = 0.1$ | | | |
| $\lambda_r$ | 0.05 | 0.1 | 0.1 | 0.70 | 0.56 | 0.2 | 0.30 | 0.28 |
| $\lambda_p$ | 0.1 | 0.1 | 0.1 | 0.76 | 0.54 | 0.29 | 0.42 | 0.29 |
| $\lambda_b$ | 0.9 | 0.01 | 0.04 | 3.7 | 0.98 | 0.03 | 0.52 | 7.4 |
| $\lambda_c$ | 0 | 0.98 | 0.95 | 0.71 | 0.01 | 0.93 | 0.46 | 0.15 |
| | | | | n = 1000 | | | | |
| | $\lambda_r = 27, \lambda_p = 26, \lambda_b = 3401, \lambda_c = 0.1$ | | | | $\lambda_r = 14, \lambda_p = 14, \lambda_b = 7115, \lambda_c = 0.1$ | | | |
| $\lambda_r$ | 0 | 0.2 | 0.19 | 0.60 | 0.3 | 0.38 | 0.34 | 0.19 |
| $\lambda_p$ | 0 | 0.24 | 0.23 | 0.61 | 0.3 | 0.4 | 0.35 | 0.19 |
| $\lambda_b$ | 0.84 | 0.02 | 0.05 | 2.95 | 0.97 | 0.05 | 0.52 | 5.4 |
| $\lambda_c$ | 0 | 0.99 | 0.95 | 0.65 | 0.01 | 0.95 | 0.47 | 0.13 |

As shown in Table 1 above, cross-validated λ yields much higher false-positive error when compared to other methods (which is consistent with N. Meinshausen et al.), and the worst total structure-reconstruction error among all competitors on very sparse problems. In particular, cross-validated λ learns a nearly-complete graph when n>p. When the original matrix is dense, cross-validated λ yields better results, but effectively it is almost equivalent to setting λ=0 (non-regularized maximum likelihood). On the other hand, λ suggested by O. Banerjee et al. yields models that are too sparse, and performs poorly both in prediction and model recovery, missing almost all edges with false-negative error often above 90%. The Bayesian approach fits between those extremes. It produces intermediate values of λ that yield a much better balance between the two types of errors (see also a typical ROC curve in FIG. 4).

Note that $\lambda_r$ that is picked by the regularized likelihood approach, tends to learn a sparser model compared to $\lambda_p$ that is picked by the joint likelihood with exponential prior on λ. $\lambda_p$ performs better when n<p using the informative prior. But as the number of observations grows, both approaches behave very similarly and they out-perform all other methods in terms of model recovery. They out-perform cross-validation method in terms of prediction when the original model is sparse and n>p.

With respect to real-life datasets such as brain imaging data (fMRI) the inventors used the fMRI data from the 2007 Pittsburgh Brain Activity Interpretation Competition (PBAIC) where the fMRI data were recorded while subjects were playing a videogame, and the task was to predict several real-value response variables. The inventors experimented with several response variables such as Instructions (whether a person is listening to audio instructions), Body (looking at virtual person), VRfixation (in VR world vs fixation) and Velocity (subject moving but not interacting with VR objects). Pittsburgh EBC Group. PBAIC, which is hereby incorporated by reference in its entirety, provides more details on these responses.

Since the "ground truth" network structure is unavailable in real-life scenario (and must be discovered), only the predictive ability of the Markov network models obtained from the various embodiments discussed above was evaluated. Table 2 below shows the average results for 3 subjects, where the dataset for each subject contained n=704 samples (measurements over time) and approximately p=33,000 variables (voxels), where SMN is the sparse Markov network embodiments of the present invention discussed above, OLs is ordinary least-squares (linear regression), and EN is Elastic Net sparse regression.

On this dataset, the inventors also experimented with Gaussian vs exponential prior on λ; Gaussian prior appears to yield slightly more accurate results that match the performance of the state-of-art sparse regression method, Elastic Net (EN); both clearly outperform linear regression. Matching state-of-art predictive performance supports confidence in the Markov network model quality, while the sparse structure of various embodiments can provide scientific insights into brain activation processes.

TABLE 2

| Response | SMN (exp) | SMN (gauss) | OLS | EN |
|---|---|---|---|---|
| s 3 ('Body') | 0.44 | 0.47 | 0.41 | 0.49 |
| 15('Instructions') | 0.52 | 0.68 | 0.69 | 0.69 |
| 22('VRfixation') | 0.77 | 0.79 | 0.78 | 0.80 |
| 24('Velocity') | 0.61 | 0.63 | 0.59 | 0.65 |

Operational Flow Diagrams

Figure 4:
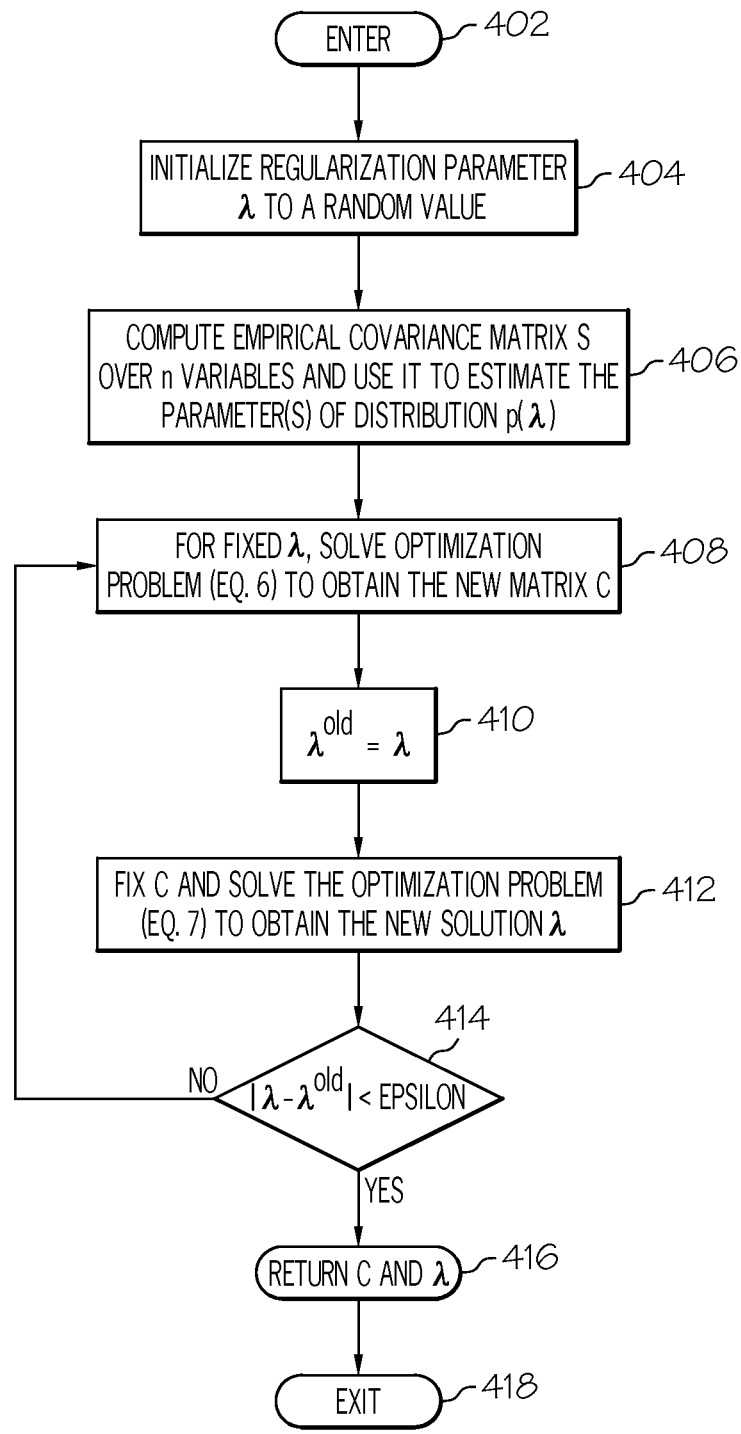
FIG. 4 is an operational flow diagram illustrating one process of reconstructing sparse Markov network structures, according to one embodiment of the present invention.

FIG. 4 is an example operational sequence illustrating one process of reconstructing sparse Markov network structures. The operational sequence begins at step 402 and flows directly into step 404. The Markov network reconstructor 114, at step 404, initializes a regularization parameter λ to a random variable. The regularization parameter λ is fixed. The Markov network reconstructor 114, at step 406, determines an empirical covariance matrix S over n variables to estimate a set of parameters p(λ) of distribution. For a fixed λ, the Markov network reconstructor 114, at step 408, solves an optimization problem $$\left( \text{e.g. } \max_{C \succ 0} \frac{n}{2}[\text{lndet}(C) - tr(SC)] + p^2 \ln\frac{\lambda}{2} - \lambda\|C\|_1 + \ln p(\lambda) \right)$$

and obtains a new matrix C. This new matrix C defines a Markov network structure for a set of data based.

The new matrix C is fixed. The Markov network reconstructor 114, at step 410, sets $\lambda^{old}=\lambda$. The Markov network reconstructor 114, at step 412, fixes the new matrix C and solves the optimization problem $$\left(\text{e.g., } \max_{\lambda} \frac{n}{2}[\text{lndet}(C) - tr(SC)] + p^2 \ln\frac{\lambda}{2} - \lambda\|C\|_1 + \ln p(\lambda)\right)$$

to obtain the new solution λ. The Markov network reconstructor 114, at step 414, determines if $|\lambda - \lambda^{old}|$ is less than epsilon 1, which is a convergence threshold. If the result of this determination is negative, the control flows back to step 408. If the result of this determination is positive, the Markov network reconstructor 114, at step 416, outputs the regularization parameter λ with the new value and the Markov network structure defined by the new matrix C. The control flow then exits at step 418.

Figure 5:
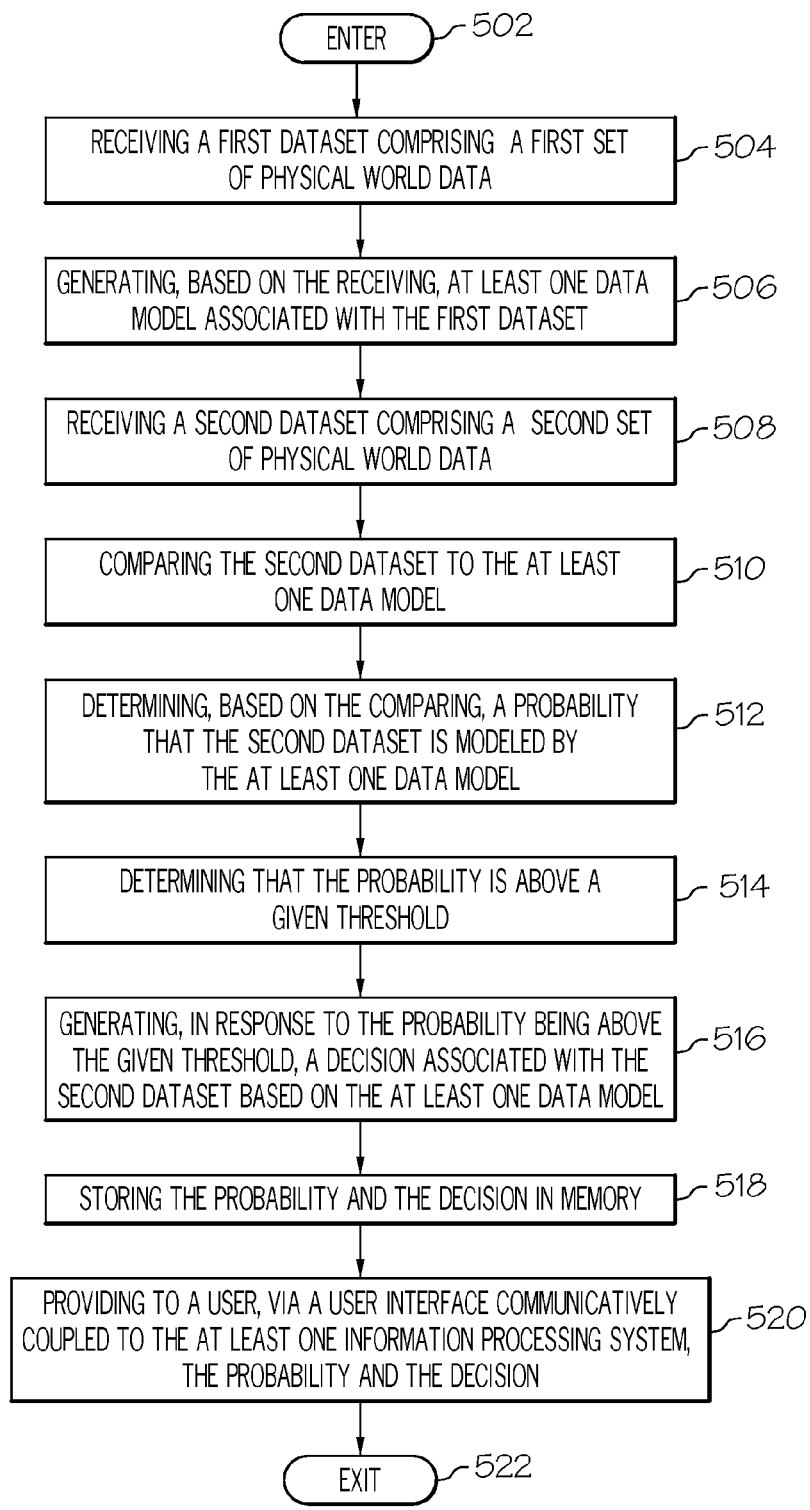
FIG. 5 is an operational flow diagram illustrating one process of utilizing a learning system, according to one embodiment of the present invention.

FIG. 5 is an operational flow diagram showing one process of using the learning system 114 according to one embodiment of the present invention. The operational sequence begins at step 502 and flows directly into step 504. The learning system 114, at step 504, receives a first dataset comprising a first set of physical world data. The learning system 114, at step 506, generates, based on the receiving, at least one data mode, such as Markov network structure information 118, associated with the first dataset. The learning system 114, at step 508, receives a second set dataset comprising a second set of physical world data. The learning system 114, at step 510, compares the second dataset to the at least one data model.

The learning system 114, at step 512, determines, based on the comparing, a probability/likelihood that the second dataset is modeled by the at least one data model. The learning system 114, at step 514, determines that the probability is above a given threshold. The learning system 114, at step 516, generates, in response to the probability being above the given threshold, a decision associated with the second dataset based on the at least one data model. The learning system 114, at step 518, stores the probability and the decision in memory. The learning system 114, at step 520, provides to a user, via a user interface coupled to at least one information processing system, the probability and the decision. The control flow then exits at step 522.

The MNS learning module 114 (i.e., learning system 114), obtains a training dataset provided as an input to the system 114 for learning sparse Markov networks from the data. This training dataset, in one non-limiting example, is a collection of brain images (training dataset). This collection of brain images can be obtained using a functional MRI scanner (data source) while a subject in the scanner is presented with stimuli, such as a sequence of pictures or sentences, a movie, or a videogame. Another non-limiting example of a training data set is gene expression data using DNA microarrays. The expression of a collection of genes is measured over a sequence of time points. In all examples above, the learning system 114 represents the training data sets 114 by an m×n matrix X, where the M rows correspond to the samples, or time points, and the N columns correspond to the variables being measured over time, such as image elements (voxels) in fMRI study, or genes in DNA microarray analysis study).

An example of solving a optimization problem discussed above, is obtaining a probabilistic model that best describes the received datasets. For example, in an example where the training dataset is the fMRI data discussed above, the learning system 114 considers the brain imaging data produced by fMRI when a subject is playing a videogame in the scanner. The subject reports his/her emotional state during the game, such as, for example, being calm versus nervous, depending on the particular situation in the videogame. The MNS learner 114 solves the optimization problem to identify the best probabilistic model of the training dataset in terms of the data likelihood, or the probability of observing such a dataset under the assumption that the model is true. In one or more embodiments, the probabilistic model is given by a sparse Markov network, described by its matrix of parameters C, that completely define the sparse Markov network. This construction of the probabilistic data model can be referred to as a first stage or the learning stage of the learning system 114.

Once the first stage is completed by the learning system 114, e.g., once the system 114 learns a model for each set of images corresponding to a particular emotional state in the example above, such as a model C1 for calm state and a model C2 for the nervous state, the system 114 can use these models in the next state, referred to as the prediction stage. For example, the system 114 receives another dataset that it has not analyzed before. This new dataset is referred to as test data. A non-limiting example of test data are a set of new brain images obtained for the same or different person performing same or different activity in the fMRI scanner. The learning system 114 retrieves the models C1 and C2 generated in the learning stage. These models C1 and C2 are used to compute the likelihood of the data, and a decision is made whether a person is in a calm vs nervous state based on which of the two models describes the data better, i.e. yields higher data likelihood.

In another example, the learning system 114 performs DNA microarray data analysis for the purpose of reconstructing gene interaction networks. Microarray data can be in the form of a matrix X, as discussed above, where the columns correspond to particular genes, and the rows are samples representing the expression level of those genes in particular samples. The training dataset is used by the learning system 114 to construct a sparse Markov network, or several sparse Markov networks. For example, in an embodiments where the training dataset is associated with two groups of subjects and their corresponding DNA microarray data, where one model C1 is generated for a group of people that are healthy and another model C2 is generated for a group of people that have a certain disease, such as cancer.

Once the learning system 114 generates the data models C1 and C2, the system 114, in the predictive stage, the system 114 a sample (test sample) for a person that has not considered before. The system 114 then retrieves the models C1 for normal subjects and C2 for cancer patients, and, and compares these models against the test data. The system 114 determines the likelihood or probability that person's DNA sample is modeled by one model C1 or C2. The system 114 determines which of the models C1, C2 has the highest probability/likelihood for the test data. If the likelihood under the second model C2, learnt on cancer patients, is greater than the likelihood under the first model C1, the system 114 outputs its prediction that the given person may have cancer, and accompanies this prediction with the likelihood computed above.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although the various example embodiments of the present invention have been discussed in the context of a fully functional computer system, those of ordinary skill in the art will appreciate that various embodiments are capable of being distributed as a program product via CD or DVD, e.g. CD 124, CD ROM, or other form of recordable media, or via any type of electronic transmission mechanism.

What is claimed is:

1. A computer implemented method for modeling data, the computer implemented method being executed on at least one information processing system, the method comprising:
   receiving a first dataset comprising a first set of physical world data;
   generating, based on the receiving, at least one data model associated with the first dataset, wherein generating the at least one data model comprises:
      determining an empirical covariance matrix S over a set of n variables in a matrix X representing the first dataset;
      initializing a regularization parameter $\lambda$ to a random variable, wherein the regularization parameter $\lambda$ is fixed; and
      estimating a set of parameters of distribution $p(\lambda)$ based on the empirical covariance matrix S;
   receiving a second dataset comprising a second set of physical world data;
   comparing the second dataset to the at least one data model;
   determining, based on the comparing, a probability that the second dataset is modeled by the at least one data model;
   determining that the probability is above a given threshold;
   generating, in response to the probability being above the given threshold, a decision associated with the second dataset based on the at least one data model;
   storing the probability and the decision in memory; and
   providing to a user, via a user interface communicatively coupled to the at least one information processing system, the probability and the decision.

2. The computer implemented method of claim 1, wherein the providing further comprises:
   displaying the probability and the decision to the user on a display.

3. The computer implemented method of claim 1, further comprising:
   determining a new matrix C that defines a Markov network structure for the first dataset;
   fixing the new matrix C;
   determining, based on at least the new matrix C that has been fixed, a new value of the regularization parameter $\lambda$;
   updating the regularization parameter $\lambda$ to the new value that has been determined; and
   outputting the regularization parameter $\lambda$ with the new value and the Markov network structure defined by the new matrix C.

4. The computer implemented method of claim 3, wherein the new martix C is fixed to its emprical estimate $S_r^{-1}$.

5. The computer implemented method of claim 3, wherein the new matrix C is determined by solving an optimization problem $$\max_{\lambda, C > 0} \frac{n}{2}[\ln\det(C) - tr(SC)] + p^2 \ln \frac{\lambda}{2} - \lambda \|C\|_1 + \ln p(\lambda),$$

where n is the n variables in the matrix X, det is a determinant of the matrix C, C is the new matrix C, tr is a trace of the matrix C, S is the empirical covariance matrix, p is a prior, $\lambda$ is the regularization parameter, and $p(\lambda)$ is the set of parameters of distribution.

6. The computer implemented method of claim 5, wherein the solving the optimization problem comprises solving the optimization problem based on at least the new matrix C that has been fixed, and further comprising using at least one of:
   an exponential prior; and
   a flat prior.

7. An information processing system for modeling physical world data, comprising:
   a memory;
   a processor, communicatively coupled with the memory;
   a user interface, communicatively coupled with the processor and the memory; and
   a learning system, communicatively coupled with the memory, the processor, and the user interface, wherein the learning system:
      receives a first dataset comprising a first set of physical world data;
      generates, based on the first dataset being received, at least one data model associated with the first dataset, wherein the learning system generates the at least one data model by:
         analyzing the first dataset; and
         based on the analyzing,
            determining a regularization parameter $\lambda$ for performing sparse Markov network reconstruction based on the first dataset, and
            determining an empirical covariance matrix C that defines a Markov network structure for the first dataset, until converging on a value for the regularization parameter $\lambda$; and
      receives a second dataset comprising a second set of physical world data;
      compares the second dataset to the at least one data model;
      determines, based on the comparing, a probability that the second dataset is modeled by the at least one data model;
      determines that the probability is above a given threshold;
      generates, in response to the probability being above the given threshold, a decision associated with the second dataset based on the at least one data model;
      stores the probability and the decision in memory; and
      provides to a user, via the user interface, the probability and the decision.

8. The information processing system of claim 7, wherein the learning system provides to the user by:
   displaying the probability and the decision to the user on a display.

9. The information processing system of claim 7, wherein the learning system generates the at least one data model by:
   determining an empirical covariance matrix S over a set of n variables in a matrix X representing the first dataset;
   initializing a regularization parameter $\lambda$ to a random variable, wherein the regularization parameter $\lambda$ is fixed; and
   estimating a set of parameters of distribution $p(\lambda)$ based on the empirical covariance matrix S.

10. The information processing system of claim 9, wherein the learning system further:
   determines a new matrix C that defines a Markov network structure for the first dataset;
   fixes the new matrix C;

determines, based on at least the new matrix C that has been fixed, a new value of the regularization parameter $\lambda$;

updates the regularization parameter $\lambda$ to the new value that has been determined; and outputs the regularization parameter $\lambda$ with the new value and the Markov network structure defined by the new matrix C.

11. The information processing system of claim 10, wherein the new martix C is fixed to its emprical estimate $S_r^{-1}$.

12. The information processing system of claim 10, wherein the new matrix C is determined by solving an optimization problem $$\max_{\lambda, C > 0} \frac{n}{2}[\text{lndet}(C) - tr(SC)] + p^2 \ln\frac{\lambda}{2} - \lambda\|C\|_1 + \ln p(\lambda),$$

where n is the n variables in the matrix X, det is a determinant of the matrix C, C is the new matrix C, tr is a trace of the matrix C, S is the empirical covariance matrix., p is a prior, $\lambda$ is the regularization parameter, and $p(\lambda)$ is the set of parameters of distribution.

13. The information processing system of claim 12, wherein the learning system solves the optimization problem based on at least the new matrix C that has been fixed using at least one of:
an exponential prior; and
a flat prior.

14. A computer readable article of manufacture tangibly embodying computer readable instructions which when executed causes a computer to carry out the steps of a method comprising:
executing on at least one information processing system the following:
receiving a first dataset comprising a first set of physical world data;
generating, based on the receiving, at least one data model associated with the first dataset, wherein the generating comprises:
analyzing the first dataset; and
based on the analyzing,
determining a regularization parameter $\lambda$ for performing sparse Markov network reconstruction based on the first dataset, and
determining an empirical covariance matrix C that defines a Markov network structure for the first dataset, until converging on a value for the regularization parameter $\lambda$;
receiving a second dataset comprising a second set of physical world data;
comparing the second dataset to the at least one data model;
determining, based on the comparing, a probability that the second dataset is modeled by the at least one data model;
determining that the probability is above a given threshold;
generating, in response to the probability being above the given threshold, a decision associated with the second dataset based on the at least one data model;
storing the probability and the decision in memory;
providing to a user, via a user interface communicatively coupled to the at least one information processing system, the probability and the decision.

15. The computer readable article of manufacture of claim 14, wherein the providing further comprises:
displaying the probability and the decision to the user on a display.

16. The computer readable article of manufacture of claim 14, wherein generating the at least one data model comprises:
determining an empirical covariance matrix S over a set of n variables in a matrix X representing the first dataset;
initializing a regularization parameter $\lambda$ to a random variable, wherein the regularization parameter $\lambda$ is fixed; and
estimating a set of parameters of distribution $p(\lambda)$ based on the empirical covariance matrix S.

17. The computer readable article of manufacture of claim 16, further comprising:
determining a new matrix C that defines a Markov network structure for the first dataset;
fixing the new matrix C;
determining, based on at least the new matrix C that has been fixed, a new value of the regularization parameter $\lambda$;
updating the regularization parameter $\lambda$ to the new value that has been determined; and
outputting the regularization parameter $\lambda$ with the new value and the Markov network structure defined by the new matrix C.

18. The computer readable article of manufacture of claim 17, wherein the new martix C is fixed to its emprical estimate $S_r^{-1}$.

19. The computer readable article of manufacture of claim 17, wherein the new matrix C is determined by solving an optimization problem $$\max_{\lambda, C > 0} \frac{n}{2}[\text{lndet}(C) - tr(SC)] + p^2 \ln\frac{\lambda}{2} - \lambda\|C\|_1 + \ln p(\lambda),$$

where n is the n variables in the matrix X, det is a determinant of the matrix C, C is the new matrix C, tr is a trace of the matrix C, S is the empirical covariance matrix., p is a prior, $\lambda$ is the regularization parameter, and $p(\lambda)$ is the set of parameters of distribution.

20. The computer readable article of manufacture of claim 19, wherein solving the optimization problem based on at least the new matrix C that has been fixed further comprises using at least one of:
an exponential prior; and
a flat prior.

* * * * *